United States Patent
Satalkar et al.

(10) Patent No.: US 9,070,169 B2
(45) Date of Patent: Jun. 30, 2015

(54) UNDO CAPABILITY FOR REMOTELY SUBMITTED USER-AUTHORED CONTENT

(71) Applicant: Microsoft Corporation, Redmond, WA (US)

(72) Inventors: Gautam Satalkar, San Jose, CA (US); David Andrew Nelson, Brooklyn, NY (US); Jon Nicolas Myette, Lake Forest Park, WA (US); Gaurang Prajapati, Redmond, WA (US); Peiyu Liu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 13/674,940

(22) Filed: Nov. 12, 2012

(65) Prior Publication Data

US 2014/0136614 A1     May 15, 2014

(51) Int. Cl.
| | |
|---|---|
| *G06F 15/16* | (2006.01) |
| *G06Q 50/00* | (2012.01) |
| *G06Q 10/10* | (2012.01) |
| *G06F 12/00* | (2006.01) |

(52) U.S. Cl.
CPC .............. *G06Q 50/01* (2013.01); *G06Q 10/10* (2013.01)

(58) Field of Classification Search
USPC .......................... 709/203, 204, 223–229, 250
See application file for complete search history.

(56) References Cited

U.S. PATENT DOCUMENTS

| | | | |
|---|---|---|---|
| 7,916,333 | B2 | 3/2011 | Yoshio et al. |
| 8,832,188 | B1 * | 9/2014 | Cierniak ...................... 709/204 |
| 2008/0086534 | A1 * | 4/2008 | Bardak et al. ................ 709/206 |
| 2010/0119053 | A1 * | 5/2010 | Goeldi ..................... 379/265.09 |
| 2013/0013700 | A1 * | 1/2013 | Sittig et al. ................... 709/206 |
| 2013/0031208 | A1 * | 1/2013 | Linton et al. ................. 709/217 |
| 2013/0036114 | A1 | 2/2013 | Wong et al. |
| 2014/0052534 | A1 * | 2/2014 | Gandhi ..................... 705/14.58 |
| 2014/0136505 | A1 * | 5/2014 | Satalkar et al. .............. 707/706 |

OTHER PUBLICATIONS

Cicero, Nick, "Facebook Double Checking to Confirm a Comment Now?", Retrieved at <<http://nickcicero.com/2012/04/27/facebook-double-checking-to-confirm-a-comment-now-5/>>, Apr. 27, 2012, pp. 2.

(Continued)

*Primary Examiner* — Zarni Maung
(74) *Attorney, Agent, or Firm* — Dave Ream; Jim Ross; Micky Minhas

(57) ABSTRACT

A user can author content, and submit such content to be posted within a social networking context, from an external service such that the user can undo the posting of such content without such content ever having been posted in the social networking context. Additionally, once such user-authored content is posted in the social networking context, the user is provided with a single action that can remove all relevant manifestations of such content. The submission of user-authored content, to a social networking service, from an external service is delayed while, simultaneously, such external service presents the user with an interface indicating that such user-authored content has already been submitted to the social networking service and posted thereon. Should the user select to undo the posting of such content prior to the expiration of the delay, the submission can simply never be performed.

20 Claims, 5 Drawing Sheets

(56) References Cited

OTHER PUBLICATIONS

"How can I approve MySpace comments before they're published?", Retrieved at <<http://www.askdavetaylor.com/how_to_approve_myspace_comments_spam.html>>, Mar. 2, 2011, pp. 3.

Hupfer, et al., "How to Stay Safe Using MySpace Settings", Retrieved at <<http://www.dummies.com/how-to/content/how-to-stay-safe-using-myspace-settings.html>>, May 25, 2010, pp. 3.

"Moderate comments", Retrieved at <<http://support.google.com/blogger/bin/answer.py?hl=en&answer=42537>>, Jul. 13, 2012, pp. 2.

"Managing Posts in Quick Blogcast", Retrieved at <<http://support.godaddy.com/help/article/3153/managing-posts-in-quick-blogcast#publish>>, Jan. 24, 2012, pp. 3.

"Blogs at Penn State", Retrieved at <<http://www.personal.psu.edu/ejp10/phon/GetStartedinBlogs.pdf>>, Jul. 13, 2012, pp. 33.

"FAQ", Retrieved at <<http://socialmediatoday.com/faq>>, Aug. 24, 2010, pp. 3.

* cited by examiner

UNDO CAPABILITY FOR REMOTELY SUBMITTED USER-AUTHORED CONTENT

BACKGROUND

As network communications among multiple computing devices have become ubiquitous, the quantity of information available via such network communications has increased exponentially. For example, the ubiquitous Internet and World Wide Web comprise information sourced by a vast array of entities throughout the world, including corporations, universities, individuals and the like. Such information is often marked, or "tagged", in such a manner that it can be found, identified and indexed by services known as "search engines". Even information that is not optimized for search engine indexing can still be located by services, associated with search engines, which seek out information available through network communications with other computing devices and enable a search engine to index such information for subsequent retrieval.

Due to the sheer volume of information available to computing devices through network communications with other computing devices, users increasingly turn to search engines to find the information they seek. Search engines typically enable users to search for any topic and receive, from this vast volume of information, identifications of specific content that is deemed to be responsive to, or associated with, the users' queries. To sort through the vast amounts of information that is available, and timely provide useful responses to users' queries, search engines employ a myriad of mechanisms to optimize the identification and retrieval of responsive and associated information.

Because search engines can serve a central function in connecting users with specific information, users often utilize search engine functionality as a steppingstone to further information collection or information exchange. Consequently, the providers of search engine functionality and searching services can enable users to perform other actions without departing from the search service, including, for example, sending messages, generating postings or otherwise authoring content that is to be shared with one or more other individuals, such as via a social networking context. Other ubiquitous network services, such as the accessing of electronic mail, can, likewise, seek to enable users to perform other actions without departing from their domain.

SUMMARY

In one embodiment, a user authoring and submitting content to a social networking service from another service that is external to the social networking service can be provided with an undo functionality, whereby the content authored and submitted by the user can be removed without such content ever having been present within the user's social network context.

In another embodiment, a user authoring and submitting content to a social networking service from another service that is external to the social networking service can be provided with a delete functionality, whereby the content authored and submitted by the user can be removed from the user's social network context via instructions submitted through such other service that is external to the social networking service.

In a further embodiment, user-authored content submitted to a social networking service from another service that is external to the social networking service can be delayed such that the user is provided with an opportunity to undo their submission without their submission ever being present within the user's social network context.

In a still further embodiment, user-authored content submitted to a social networking service from another service that is external to the social networking service can be presented to the user, via such other service, as if it were already part of the user's social network context, even though the actual submission to the social networking service can be delayed to provide the user with an opportunity to undo their submission without their submission ever being present within the user's social network context.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
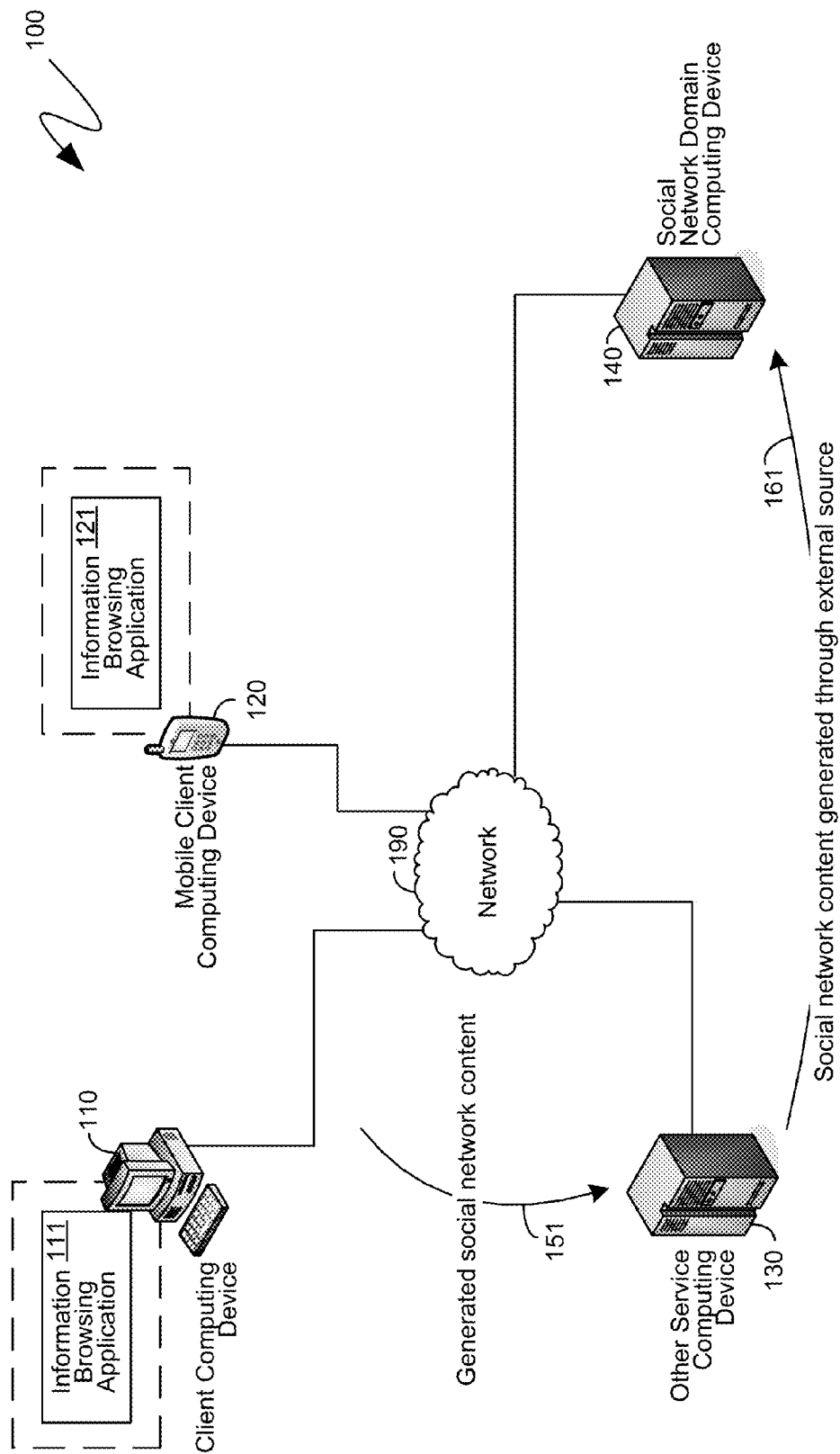
FIG. 1 is a block diagram of an exemplary network of computing devices exchanging communications for generating social network content through services external to a social network service.

The following descriptions are directed to mechanisms and interfaces by which a user can author content and submit such content to be posted within a social networking context from a service that is external to the social networking service such that the user is afforded an opportunity to change their mind and undo the posting of such content without such content ever having been posted in the social networking context in the first place. Additionally, once such user-authored content is posted in the social networking context, the user can be provided with a single action that can remove all relevant manifestations of such content. The submission of user-authored content, to a social networking service, from a service external to the social networking service, can be delayed while, simultaneously, such external service can present the user with an interface indicating that such user-authored content has already been submitted to the social networking service and posted thereon. Should the user select to undo the posting of such content prior to the expiration of the delay in the submission of such content to the social networking service, the submission can simply never be performed, and the user-authored content can be removed from such external service.

For purposes of illustration, the techniques described herein make reference to existing and known application user interface contexts, such as user interfaces typically presented by Web browsers. Also for purposes of illustration, the techniques described herein make reference to existing and known protocols and languages, such as the ubiquitous HyperText Transfer Protocol (HTTP) and the equally ubiquitous HyperText Markup Language (HTML). Such references, however, are strictly exemplary and are not intended to limit the mechanisms described to the specific examples provided. Indeed, the techniques described are applicable to any application user interface including, for example, lifestyle and/or entertainment applications, such as audio and/or video presentation applications, video games, virtual reality applications, electronic book readers, and other content consuming and presentation applications. Similarly, the described functionality is not limited to the generation and posting of content to a social networking context, but rather can be applied to the generation and posting of content in any context from a service or mechanism that is external to, and operates independently of, whatever service such content is being directed to and posted through. Thus, for example, the mechanisms described below are equally applicable to the generation and transmission of, for example, an email message through an email service from an email authoring interface that is external to the email service and which can delay provision of the email message to the email service, thereby enabling a user to change their mind and undo the transmission of the message, in accordance with the mechanisms described below.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, which provides context for the descriptions below. The exemplary system 100 of FIG. 1 is shown as comprising a traditional desktop client computing device 110, and a mobile client computing device 120 that are both communicationally coupled to a network 190. The network 190 also has, communicationally coupled to it, a social network domain computing device 140 that can maintain a social networking context including, for example, messages exchanged between users of the social networking service, information posted by users of the social networking service within their own context, such as "pages" or "walls" directed to such users, and other like social networking contexts. Also communicationally coupled to the network 190 can be another service computing device 130 that can provide a service independent of the social networking service provided by the social network domain computing device 140. In one embodiment, the other service computing device 130 can be a search engine computing device that can provide a search service. In other embodiments, however, the other service computing device 130 can provide other services such as, for example, email services, messaging services, information hosting or browsing services and the like.

Both the client computing device 110 and the mobile client computing device 120 are shown as comprising information browsing applications 111 and 121 to illustrate that the mechanisms described below are equally applicable to mobile computing devices, including laptop computing devices, tablet computing devices, smartphone computing devices, and other like mobile computing devices, as well as to the ubiquitous desktop computing devices. For purposes of the descriptions below, references to the information browsing application 111 executing on the client computing device 110 are intended to be equally applicable to the information browsing application 121 executing on the mobile client computing device 120, and vice versa. In one embodiment, the information browsing application 111, or the information browsing application 121, can be the ubiquitous web browser that can retrieve and display information in the form of websites that are hosted by web servers communicationally coupled to the network 190, such as those described above. However, as indicated previously, the mechanisms described below are not limited to World Wide Web-based environments. Thus, for example, the information browsing applications 111 and 121, can be other types of information browsing applications including, for example, e-book readers, universal document format readers, or even content creation applications, such as word processors, spreadsheets, presentation applications, and e-mail applications. Yet another type of information browsing application can be an operating system itself, including, for example, operating systems comprising support for known networking protocols for the receipt and presentation of information and operating systems comprising information browsing components or built-in or included information browsing applications.

In one embodiment, a user of the client computing device, such as the client computing device 110 or the mobile client computing device 120, can utilize the service provided by the other service computing device 130, such as, for example, the search service, to generate social network content 151 through such other service that is ultimately to be posted to the user's social network context, as maintained by the social network domain computing device 140. In such an embodiment, the other service computing device 130 can, upon accepting the social network content 151 authored by the user, deliver such user-authored content to the social network domain computing device 140, as illustrated by the communication 161. As will be recognized by those skilled in the art, the social network domain computing device 140 can execute a social network service that can expose application program interfaces which can be utilized with the other service executing on the other service computing device 130 to deliver the user-authored content in a manner compatible with the social network service executed by the social network domain computing device 140.

Figure 2:
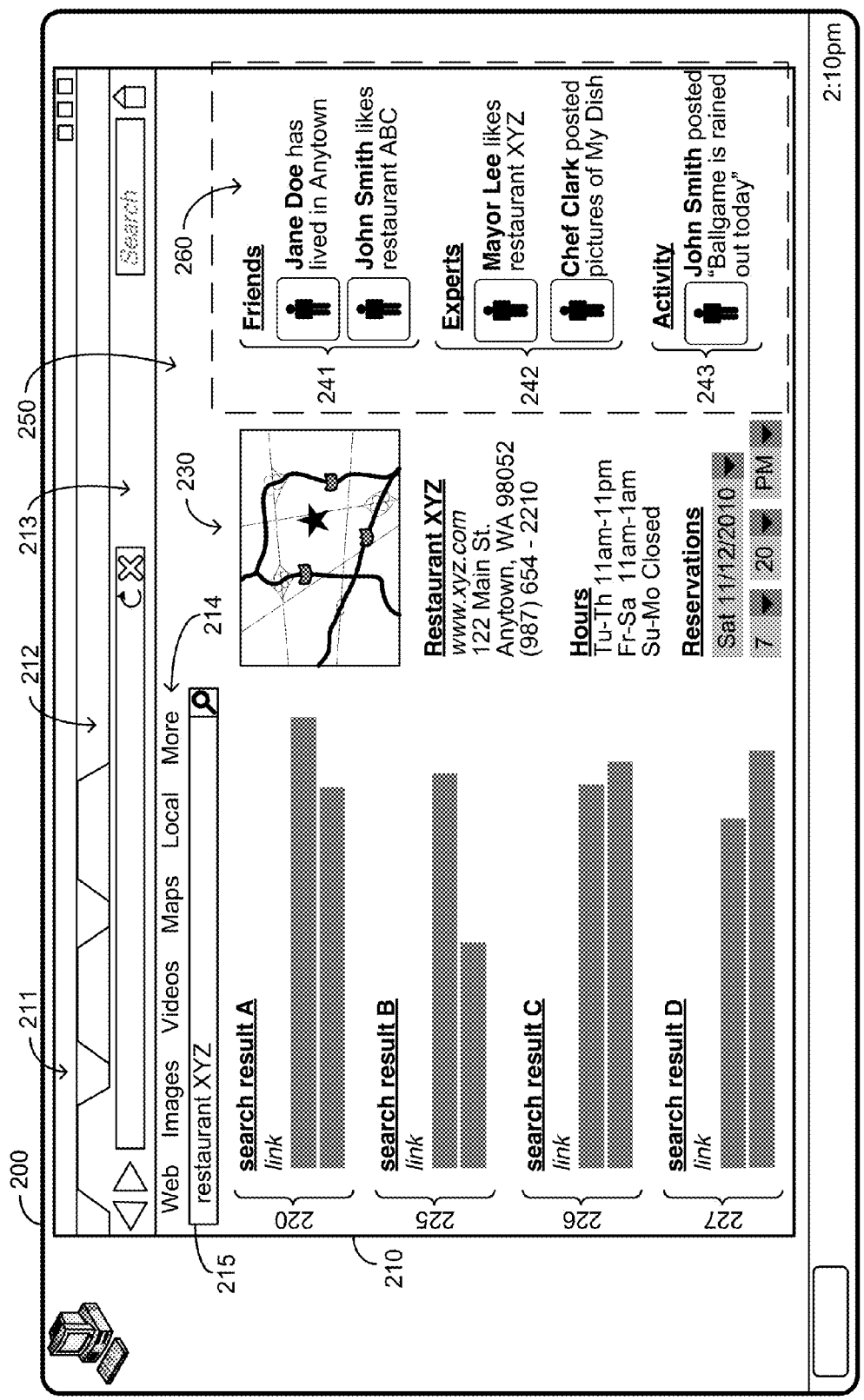
FIG. 2 is a block diagram of an exemplary user interface within which a user can author content to be provided within a social networking context from a service external to the social networking service.

Turning to FIG. 2, an exemplary user interface 200 is illustrated to provide context for the descriptions below. The exemplary user interface 200 can be a user interface that can be provided by another service through which the user is generating and posting user-authored content to a social network context. In the particular example illustrated by the exemplary user interface 200, the other service can be a search service that can provide search results in multiple panes, or other like defined visual display areas. Although illustrated within the context of a type of user interface that would typically be presented by a personal computing device, the descriptions provided below are equally applicable to user interfaces of the types provided by mobile computing devices. Providing context for the descriptions below, the exemplary user interface 200 of FIG. 2 is shown as comprising a desktop user interface motif within which an application window 210 is presented. The application window 210 can be presented by an information browsing application, such as those described in detail above, which can receive multidimensional search results in response to a user's search query. The application window 210 can comprise a window control area 211 with which the appearance of the window 210 within the user interface 200 can be controlled. Additionally, in one embodiment, the information browsing application can be capable of presenting multiple different sets of content within tabs, and such tabs can be accessed through a tab selection area 212.

User specification of requested content can, in one embodiment, be controlled through a toolbar area 213, which can comprise mechanisms by which users can directly specify content, such as through content resource locators or other like content identifiers, mechanisms by which users can browse through content that was previously viewed, such as through navigational interfaces, and other like content control mechanisms. The content itself can be displayed in a content presentation area 250 which, in the exemplary user interface 200 as illustrated in FIG. 2, can comprise content received from a search engine that is capable of providing search results comprising, not only traditional document search results, but also entity search results and people search results. In particular, a search engine can provide links through which users can specify the type of content for which they are searching, an entry mechanism by which users can provide search queries, and, ultimately, search results. Within the context of the exemplary user interface 200 that is shown in FIG. 2, the links provided by the search engine are shown as the links 214 that are displayed in the content presentation area 250 and such links can, exemplarily, allow users to focus their search on images, videos, locations and the like. Similarly, the entry mechanism by which users can provide search queries is shown in exemplary user interface 200 as the search entry area 215, which is also displayed in the content presentation area 250.

To provide a specific exemplary context, a user being presented the exemplary user interface 200 of FIG. 2 can have searched for a particular retail establishment such as, for example, a particular restaurant. Consequently, the search entry area 215 is illustrated as comprising a user search query for a particular restaurant. In response to such query, the search engine can return various types of search results. One type of search results that can be returned can be an identification of documents or pages that reference the restaurant searched for, or are otherwise relevant to, such a restaurant. Thus, as illustrated in the exemplary user interface 200, ori-ented on the left side of the content presentation area 250, can be a listing of search results 220, 225, 226 and 227. The search results 220, 225, 226 and 227 can be presented any format, though they are illustrated in the exemplary user interface 200 utilizing a common format for providing webpage search results within the context of the ubiquitous World Wide Web. Another type of search results that can be returned can comprise entity and task information that can be responsive to the user's search query. For example, in the exemplary user interface 200, where a user is being provided with search results responsive to the user's search query of a particular restaurant, the restaurant the user searched for, as an entity, can be identified and entity information, such as the location of that entity, the name, address and contact information for such an entity, and other like entity information, can be presented. Such entity information is shown in the exemplary user interface 200 of FIG. 2 as the entity information 230.

Of relevance to the descriptions below, another type of search results that can be returned can comprise people search results 260 that identify human individuals that are deemed to be relevant to the user's search query. Thus, as illustrated by the exemplary user interface 200 of FIG. 2, one or more friends 241 can be identified in response to the user's search query. In the particular example illustrated in FIG. 2, where a user searched for a specific restaurant, the friends 241 that are identified to the user need not necessarily be individuals that the user knows that have eaten at that specific restaurant, but rather can simply be individuals whom the user knows who have a connection to the user's search, such as by living the same town as the searched for restaurant, or have otherwise expressed an interest in food related topics.

As also illustrated by the exemplary user interface 200, one or more experts 242 can also be identified in response to a user's search query. Such experts can, in one embodiment, have particularized knowledge that is relevant to the user's search query. Thus, in the specific example illustrated in FIG. 2, where the user's search query was for a specific restaurant, the experts 242 that can be identified can be individuals that have eaten at that specific restaurant and who have a particularized set of knowledge or experience relevant to restaurants or dining. In another embodiment, experts 242 can be individuals whose opinions, insight or other intellectual product can be valued due to reasons other than their base of knowledge. For example, experts 242 can include celebrities, politicians and other famous people, irrespective of any particularized knowledge they may have regarding the user's search query. As another example, experts 242 can include influential individuals, or individuals who maintain connections with other powerful people, such as business or community leaders.

In addition to an identification of people, search results 260 can also include identification of activities performed by, or associated with, specific individuals that are relevant to the user's search query. Thus, for example, activity 243 can comprise actions performed by, or information posted by, those individuals that were presented as part of the friends 241, the experts 242, or combinations thereof. The activity 243 can, in such an embodiment, provide the user with easy access to the most recent information authored by, or shared by, individuals that were deemed to be relevant to the user's search query.

Figure 3:
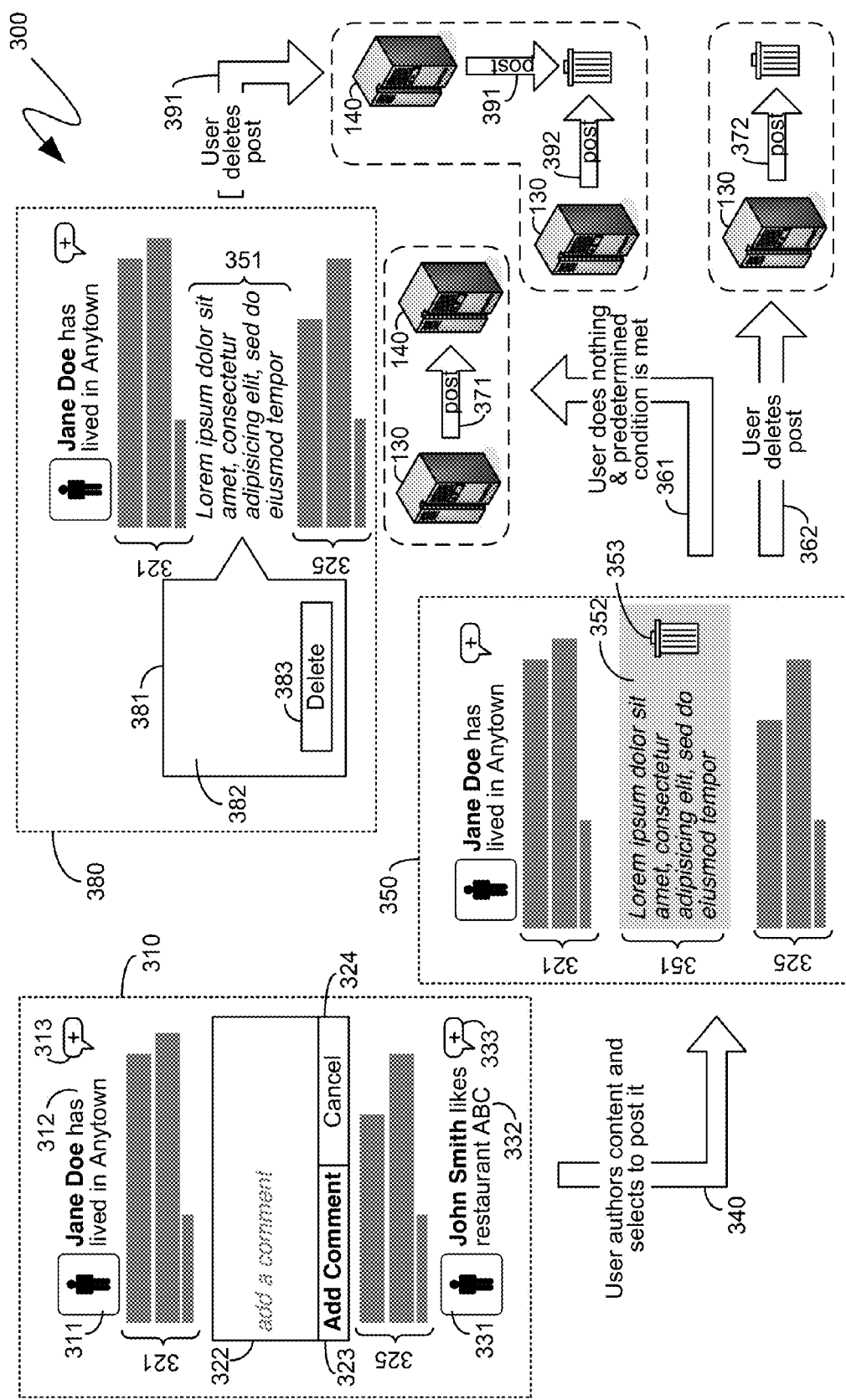
FIG. 3 is a block diagram of an exemplary sequence by which user-authored content can be submitted to a social networking service.

Within the context of the people search results 260 the user can be provided with mechanisms by which the user can interact with such individuals in a social networking context. For example, the user can be provided with mechanisms by which the user can send messages to the individuals identified in the people search results 260, respond to postings of such individuals, and other like communication and interaction mechanisms within a social networking context. Turning to FIG. 3, the system 300 shown therein illustrates an exemplary series of mechanisms and associated portions of a user interface, such as portions of the user interface 200 that can be presented within, or as part of, the people search results 260. A portion 310 of a user interface illustrates various user interface elements that can be presented to a user as part of a larger user interface, such as the exemplary user interface 200 described in detail above, which can enable the user to author content and post such content in a social networking context. For example, the portion 310 of a user interface can comprise a content authoring area 322 within which a user can author content and then post such content by, for example, selecting the add comment selector 323. Also part of the portion 310 of a user interface can be the cancel selector 324 that can enable user to cancel an attempt at posting content.

In one embodiment, at least a part of the social networking context within which the user-authored content would be posted can be displayed in the user interface of another service. For example, the portion 310 of a user interface can comprise previously authored content 321 and 325 that can represent part of the social networking context within which any content authored by the user, in the content authoring area 322, can be presented. Another part of the social networking context within which the user-authored content would be posted can be the identification of an individual to whom the user is directing such a post, or an initial action or content generated by such an individual. For example, the portion 310 of a user interface can comprise images of various individuals to whom the user may direct user-authored content including, for example, the images 311 and 331. Similarly, the portion 310 of the user interface can comprise informational content 312 and 332, identifying those individuals and potentially relevant actions or authored content of those individuals. In one embodiment, the user can initiate an authoring of content that can be directed to a social networking context by selecting a messaging user interface element, such as the messaging user interface element 313 or the messaging user interface element 333.

As illustrated by the system 300 of FIG. 3, a user can utilize the user interface elements shown in the portion 310 of a user interface to author content that is to be posted as part of a social networking context. Once the user has authored the content that they seek to post to a social networking context, the user can select the add comment selector 323, as represented by the action arrow 340. As illustrated by the action arrow 340, such an action on the part of the user can cause the user interface to transition such that the portion 310 of the user interface, which was previously presented to the user in order to enable user to generate user-authored content, is no longer displayed and is, instead, replaced by a different portion 350 of the user interface.

In one embodiment, as illustrated by the portion 350, the user interface can now indicate to the user that the user-authored content 351 has, in fact, already been posted in the social networking context. More specifically, if a user authors content within the content authoring area 322 and selects the add comment selector 323, the user interface can transition such that, as illustrated by the portion 350, the user-authored content 351 is presented to the user in a manner in which the user would expect such content to be presented if it was already posted in the social networking context. For example, the user-authored content 351 can be presented in-line with other content, such as the content 321 and 325 that was initially shown in the portion 310 of the user interface. In such a manner, the user interface can cause the user to believe that the user-authored content 351 has already been posted to the social networking context to which it was directed.

However, the actual transmission of the user-authored content 351 to a social networking service can, in one embodiment, be initially delayed. Instead, in such an embodiment, the actual presentation of the user-authored content 351 to a social networking service can occur upon a pre-determined condition being met and can require no additional user action. Thus, as illustrated by the action arrow 362 in the exemplary system 300 of FIG. 3, the user-authored content 351 can be transmitted, as indicated by the transmission 371, from a computing device, such as the server computing device 130, initially illustrated in FIG. 1, that can execute a service external to the social networking service, to a server computing device executing the social networking service such as, for example, the server computing device 140, which was also initially illustrated in FIG. 1.

In one embodiment, a predetermined condition, which can cause the transmission 371 of the user-authored content 351 to the social networking service, can be the passage of a predetermined period of time. Thus, for example, as indicated by the action arrow 340, a user can author content and can select the add comment selector 323, thereby causing the user-authored content 351 to appear as if it was already posted within the social networking context. After the passage of a predetermined period of time, such as a few seconds, without any further user action, the user-authored content 351 can be transmitted, as indicated by the transmission 371, to the social networking service in order to be posted within a social networking context. The transition between the mere visual presentation, to the user, of the user-authored content 351 as already having been posted within a social networking context, to the actual transmission of the user-authored content to a social networking service, as illustrated by the action arrow 361, can be based on the lack of any further user action directed to the user-authored content 351, and the passage of the predetermined period of time. As will be recognized by those skilled in the art, in the above-described embodiment a user will perceive that the user-authored content 351 has been posted to the social networking context in response to the user's selection of the add comment selector 323, since the user will not likely be aware that the actual transmission 371 of the user-authored content 351 did not occur until a subsequent period in time.

As indicated previously, in one embodiment, the passage of a predetermined period of time, such as a few seconds, without any further user action can result, as indicated by the action arrow 361, in the posting of the user-authored content to the social networking service. Such an embodiment can provide an opportunity, as will be described in further detail below, for the user to change their mind and undo the posting action, while at the same time avoiding unnecessary delay in the posting of content that the user had already indicated that the user desired to have posted, such as by the selection of the add comment selector 323. In other embodiments, however, the predetermined period of time can be greater than a few seconds, such as to provide the user with a greater window of opportunity within which to change their mind.

In another embodiment, other predetermined conditions can be established to trigger the posting of the user-authored content to the social networking context. For example, user action directed to another user interface can trigger the posting of the user-authored content. More specifically, once a user interface, such as that comprising the portion 350, has been displayed to a user, the user can be led to believe that the user-authored content 351 has already been transmitted to the social networking service, and has been posted within the social networking context. Consequently, the user can direct their attention elsewhere such as, for example, by closing a window, or other like analogous user interface element, comprising the portion 350. In such an instance, the transmission 371 can be triggered and the user-authored content 351 can be delivered to the social networking service for posting. As another example, a predetermined condition can be based on a combination of factors such as, for example, a passage of a predetermined amount of time in combination with user action directed to another user interface element.

By delaying the transmission 371, of the user-authored content 351, to the social networking service, the user can be afforded the opportunity to undo the posting of the user-authored content 351 without such content ever having been posted within a social networking context. In particular, as will be recognized by those skilled in the art, a posting made within a social networking context can be immediately visible to a myriad of other individuals who can digitally archive such content, such as, for example, by taking a screenshot or utilizing other like digital archival methodology. Consequently, it can be desirable for a user to be able to remove some user-authored content without such content ever having been made visible to anyone other than the user. In the exemplary system 300 shown in FIG. 3, the user can perceive, when presented with the user interface that can comprise the portion 350, that the user-authored content 351 has already been posted in a social networking context. However, should the user subsequently change their mind and seek to undo the posting of such content, they can be provided with a delete option 353 within the portion 350 of the user interface. Were a user to select such a delete option 353, as indicated by the action arrow 362, the user-authored content 351 can simply be deleted by the computing device executing the service, such as a search service, that the user utilized to generate such content. However, since such content can not have been initially transmitted to a social networking service, the deletion 372 of such content from an external service, that is external to the social networking service, results in the deletion of the user-authored content without it having been visible by another individual via the social networking context within which it was intended to be posted.

In one embodiment, to illustrate to the user that the user-authored content 351 remains in a state in which the user can utilize the delete option 353, a shaded or colored background 352, shaded or colored text (not shown), or other like visual indicator can be utilized to distinguish the user-authored content 351 from other content in the social networking context, such as the content 321 and 325. In such an environment, once the predetermined condition is met and the transmission 371, of the user-authored content 351, has already occurred, such as indicated by the action arrow 361, the shaded background 352 and the delete option 353 can be removed or no longer displayed in such a manner. In particular, and as illustrated by the portion 380 of an exemplary user interface, the user-authored content 351 can be presented within a social networking context, including other social networking content 321 and 325, without distinguishing characteristics, such as the shaded background 352.

Once the user-authored content 351 has been transmitted, as illustrated by the transmission 371, to the social networking service and has been posted as part of the social networking context, a user can still be provided with the opportunity to modify or delete such user-authored content 351 through an interface provided by a service that is external to the social networking service such as, for example, a search service. Thus, as illustrated in the portion 380 of an exemplary user interface, the user-authored content 351 can be presented in the same manner as any other social networking content, such as the social networking content 321 and 325 including, for example, the presentation of an additional user interface element 381 should a user action, such as a hover, click or touch action, be directed to the user-authored content 351. The additional user interface element 381 can comprise an information presentation area 382 that can provide the user with additional content or information including, for example, all of the user-authored content 351 to the extent that all such user-authored content 351 was not already visible within the portion 380 of an exemplary user interface. Of relevance to the descriptions below, the additional user interface element 381 can include a delete option 383 which can serve to delete the user-authored content 351.

More specifically, if the user were to select the delete option 383, such as is represented by the action arrow 391, the external service with which the user is interacting, which can be executed on the server computing device 130, can delete the user-authored content 351 as illustrated by the deletion 392. Additionally, however, since the user-authored content 351 can have already been transmitted to the social networking service, such a social networking service can also be informed to delete the user-authored content 351, and it can do so independently of such other external service, as indicated by the deletion illustrated by the action arrow 391. In such a manner, user interaction with a service external to the social networking service can still enable the user to modify or delete user-authored content without navigating an application program, such as a web browser application program, to the social networking service itself to perform such an action. Enabling a user to modify or delete such user-authored content 351, without requiring the user to navigate to the social networking service and utilize user interface mechanisms provided thereby, can allow the user to modify or delete such user-authored content 351 more quickly and efficiently, which, as will be recognized by those skilled in the art, can be important given the rapidity with which social network content can be accessed and disseminated.

While the above descriptions have been provided within the context of new user-authored content, they are equally applicable to edits, where the "user-authored content" is an edit of content previously present in the social networking context. More specifically, in such an embodiment, should the user change their mind and select the delete option, only the edits can be deleted, leaving the content previously posted unchanged. Alternatively, the user can be provided with an option as to whether to discard only the edits or to remove the entire post. In the latter case, a communication could be transmitted to the social networking service, requesting deletion of the previously authored content, while the external service through which the user made such edits can discard both such previously authored content and the newly authored edits. In a similar manner, the above descriptions can be applied to any other creation, modification, or deletion of user-authored content within the social networking context.

Figure 4:
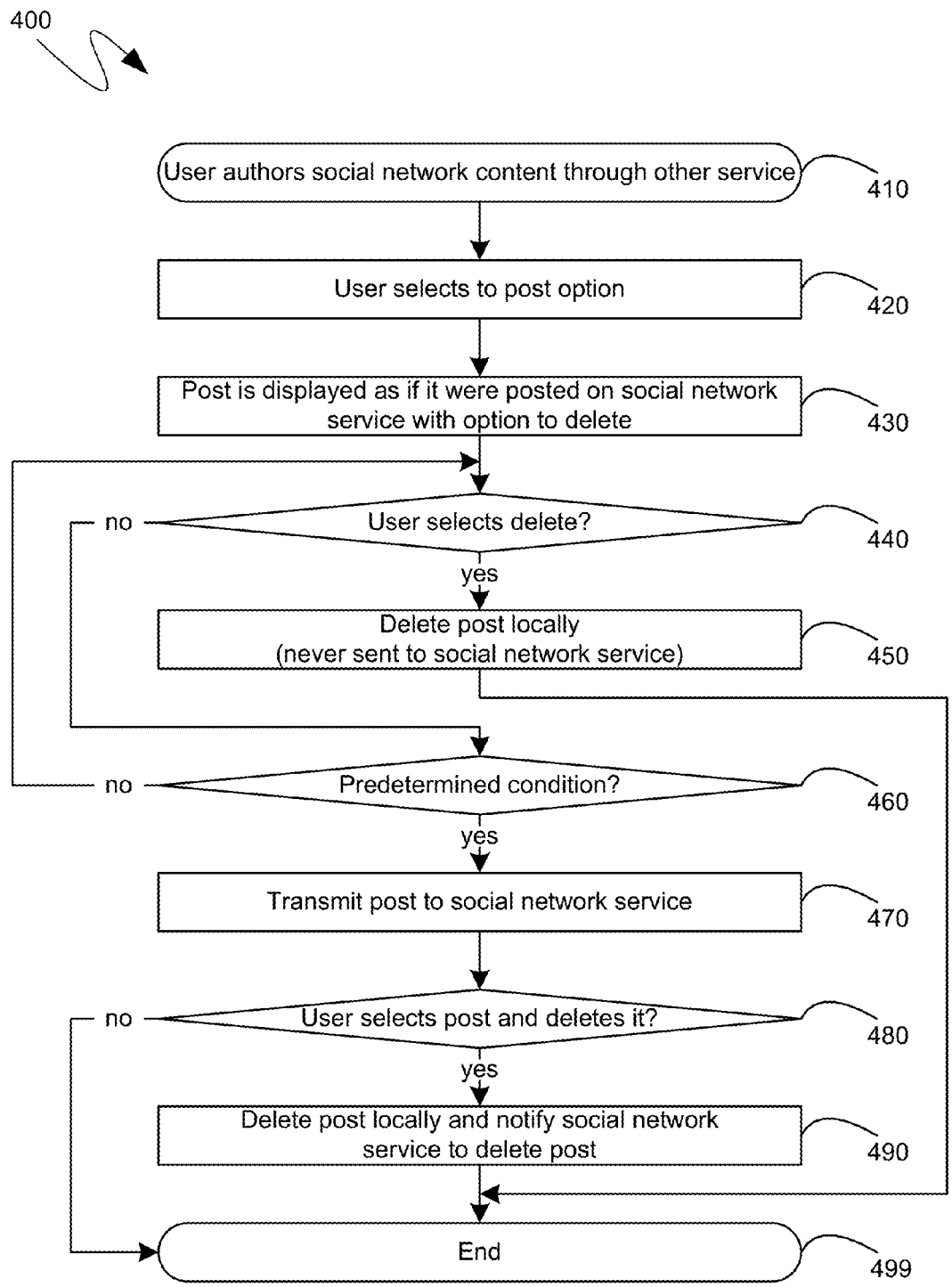
FIG. 4 is a flow diagram of an exemplary operation of computer-executable instructions for submitting user-authored content to a social networking service.

Turning to FIG. 4, the exemplary flow diagram 400 shown therein illustrates exemplary series of steps that can be performed by a service external to a social networking service that can provide functionality to a user in so far as directing user-authored content to the social networking service to be posted in a social networking context. Initially, as illustrated, at step 410, a user can author content that the user desires to be posted in a social networking context. Subsequently, at step 420, the user can select a post option, or generate another like user input, that can cause such user-authored content to be posted in a social networking context. At step 430, in response to the user's instruction to post the user-authored content at step 420, the user-authored content can be displayed to the user as if it were already posted within the social networking context, and as if it were already transmitted to the social networking service. At step 440, a determination can be made as to whether the user has selected to modify or delete such user-authored content. If, at step 440, the user has not selected to modify or delete such content, processing can proceed to step 460 where it can be determined whether a predetermined condition has been met. If, at step 460, is determined that a predetermined condition has not yet been met, then processing can repeat the determinations at steps 440 and 460 until either the user chooses to modify or delete their post, or until the predetermined condition is met.

If it is determined, at step 440, that the user selected a delete option prior to the fulfillment of the predetermined condition at step 460, processing can proceed to step 450 and the content authored by the user can be deleted locally. Since such user-authored content was not yet, at step 450, sent to the social network service, there can be nothing further to delete, and the user need not be concerned than any other individual was able to view such user-authored content from the social network context within which it would have been posted. The relevant processing, after such a deletion at step 450, can end at step 499. On the other hand, if it is determined, at step 460, that the predetermined condition is met, processing can proceed to step 470. As indicated previously, in one embodiment, the predetermined condition of step 460 can be the passage of time. As also indicated previously, in other embodiments, the predetermined condition of step 460 can be based on a combination of one or more of the passage of time, user actions, and other like conditions. At step 470 the user-authored content can be transmitted to a social network service to be posted in a social network context.

If, after the user-authored content has been transmitted to the social network service at step 470, the user decides that they desire to modify or delete such user-authored content, the user can select such content as it is displayed by the service external to the social network service, and can delete it. At step 480, a determination can be made whether the user performed such a selection and deletion. If the user has not performed such a selection and deletion, then processing can end at step 499. Conversely, if the user instructs the external service to delete the user-authored content, processing can proceed to step 490 where such user-authored content can be deleted by the external search service and the external search service can also notify the social network service to delete such content. The relevant processing can then proceed to end at step 499.

Figure 5:
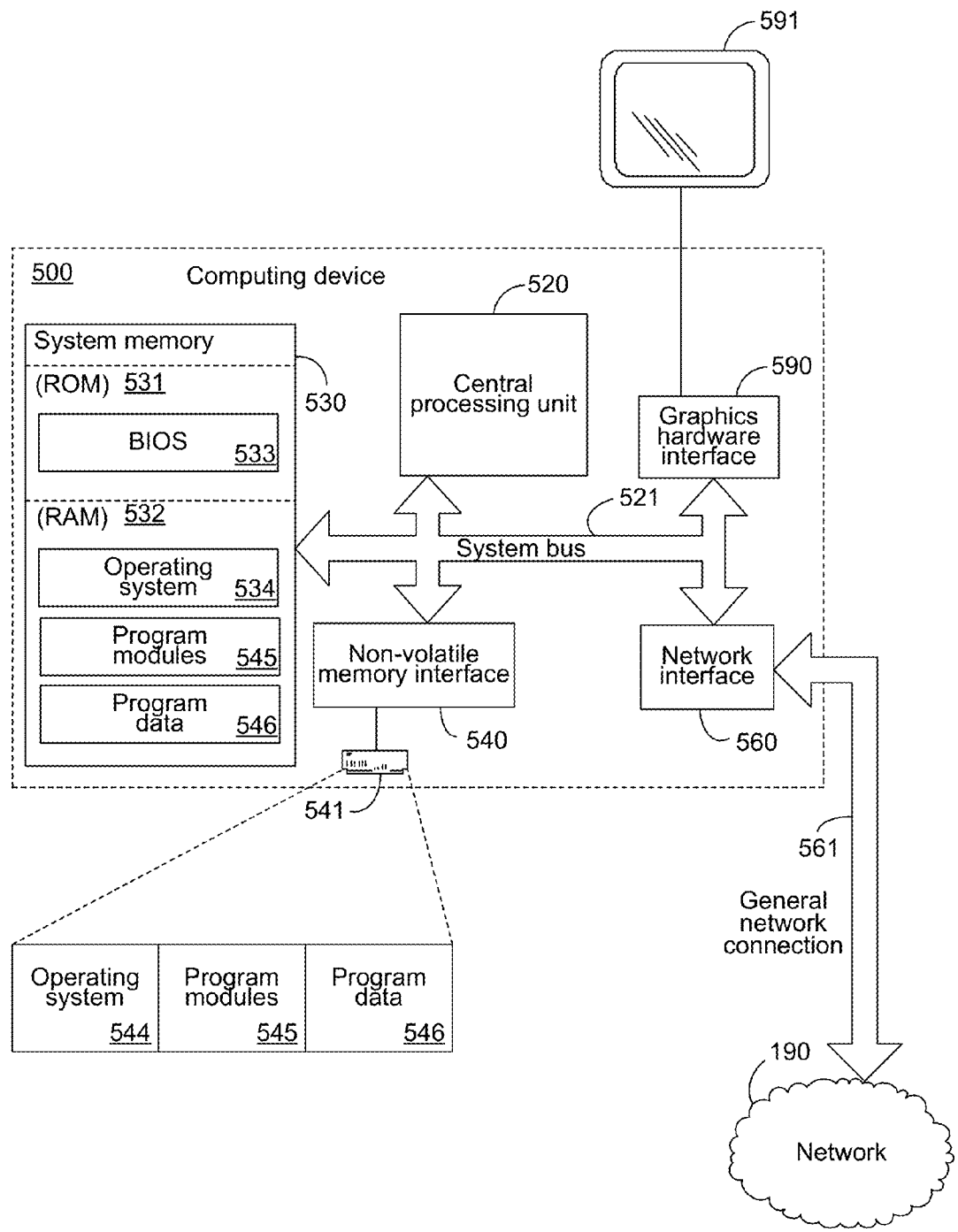
FIG. 5 is a block diagram of an exemplary computing device.

Turning to FIG. 5, an exemplary computing device 500 is illustrated. The exemplary computing device 500 can be any one or more of the computing devices illustrated in FIG. 1, whose operations were described in detail above. The exemplary computing device 500 of FIG. 5 can include, but is not limited to, one or more central processing units (CPUs) 520, a system memory 530, that can include RAM 532, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, such as for the display of visual user interfaces, including, but not limited to, a graphics hardware interface 590 and a display device 591, which can include display devices capable of receiving touch-based user input, such as a touch-sensitive, or multi-touch capable, display device.

Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and the aforementioned RAM 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates the operating system 534 along with other program modules 535, and program data 536.

The computing device 500 may also include other removable/non-removable, volatile/nonvolatile computer storage media. By way of example only, FIG. 5 illustrates the hard disk drive 541 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 can operate in a networked environment using logical connections to one or more remote computers. The computing device 500 is illustrated as being connected to the general network connection 561 through a network interface or adapter 560, which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 561. It will be appreciated that the network connections shown are exemplary and other means of establishing a communications link between computing devices may be used.

As can be seen from the above descriptions, mechanisms and user interfaces have been presented for providing a user with undo functionality for the posting of authored content that is to be posted by a service which is external to the service through which such content is being authored and posted. In view of the many possible variations of the subject matter described herein, we claim as our invention all such embodiments as may come within the scope of the following claims and equivalents thereto.

We claim:

1. A system for managing user-authored content directed to a social networking context, the system comprising:
    one or more processing units;
    a network interface;
    a display device; and
    one or more computer-readable storage media communicationally coupled to the one or more processing units and to the network interface, the one or more computer-readable storage media comprising computer-executable instructions, which, when executed by the one or more processing units, cause the system to perform steps comprising:
        receiving an instruction from a user to post the user-authored content to the social networking context, which is maintained by a social networking service that is external to a service from which the computer-executable instructions were received by the system through the network interface;
        generating, on the display device, a presentation of the user-authored content such that the presented user-authored content appears to have already been posted to the social networking context; and
        transmitting the user-authored content to the social networking service after the generating the presentation only if both at least one predetermined condition, exclusive of the received instruction, is met and the user has not attempted to undo the posting of the user-authored content subsequent to the receiving the instruction.

2. The system of claim 1, wherein the one or more computer-readable storage media comprise further computer-executable instructions for discarding the user-authored content if the user attempts to undo the posting subsequent to the receiving the instruction but prior to the transmitting the user-authored content to the social networking service.

3. The system of claim 1, wherein the computer-executable instructions for generating the presentation of the user-authored content comprise computer-executable instructions for providing a deletion option until the at least one predetermined condition is met; and removing the deletion option after the at least one predetermined condition is met.

4. The system of claim 1, wherein the computer-executable instructions for generating the presentation of the user-authored content comprise computer-executable instructions for presenting the user-authored content on a differently colored background from other content from the social networking context until the at least one predetermined condition is met; and presenting the user-authored content on a same background as the other content from the social networking context after the at least one predetermined condition is met.

5. The system of claim 1, wherein the at least one predetermined condition is a passage of a predetermined amount of time since the receiving the instruction.

6. The system of claim 1, wherein the user-authored content was authored via an interface provided by the service from which the computer-executable instructions were received by the system, and which is external to the social networking service.

7. The system of claim 1, wherein the user-authored content comprises edits to prior content that is already part of the social networking context.

8. The system of claim 1, wherein the one or more computer-readable storage media comprise further computer-executable instructions for: receiving, after the transmitting the user-authored content to the social networking service, an instruction from the user to delete the user-authored content from the social networking context; and transmitting a request to the social networking service to delete the user-authored content in response to the received instruction from the user to delete the user-authored content.

9. A method for managing user-authored content directed to a social networking context, the method comprising the steps of:
    receiving an instruction from a user to post the user-authored content to the social networking context, which is maintained by a social networking service that is external to a service through which the user-authored content was authored;
    generating a presentation of the user-authored content such that the presented user-authored content appears to have already been posted to the social networking context; and
    transmitting the user-authored content to the social networking service after the generating the presentation only if both at least one predetermined condition, exclusive of the received instruction, is met and the user has not attempted to undo the posting of the user-authored content subsequent to the receiving the instruction.

10. The method of claim 9, further comprising the steps of: discarding the user-authored content if the user attempts to undo the posting subsequent to the receiving the instruction but prior to the transmitting the user-authored content to the social networking service.

11. The method of claim 9, wherein the generating the presentation of the user-authored content comprises providing a deletion option until the at least one predetermined condition is met; and removing the deletion option after the at least one predetermined condition is met.

12. The method of claim 9, wherein the generating the presentation of the user-authored content comprises method of claim 9 presenting the user-authored content on a differently colored background from other content from the social networking context until the at least one predetermined condition is met; and presenting the user-authored content on a same background as the other content from the social networking context after the at least one predetermined condition is met.

13. The method of claim 9, wherein the at least one predetermined condition is a passage of a predetermined amount of time since the receiving the instruction.

14. The method of claim 9, wherein the user-authored content was authored via an interface provided by the service through which the user-authored content was authored, which is external to the social networking service.

15. The method of claim 9, wherein the user-authored content comprises edits to prior content that is already part of the social networking context.

16. The method of claim 9, further comprising the steps of: receiving, after the transmitting the user-authored content to the social networking service, an instruction from the user to delete the user-authored content from the social networking context; and transmitting a request to the social networking service to delete the user-authored content in response to the received instruction from the user to delete the user-authored content.

17. A system for managing user-authored content directed to a social networking context, the system comprising:
one or more processing units;
a network interface; and
one or more computer-readable storage media communicationally coupled to the one or more processing units and to the network interface, the one or more computer-readable storage media comprising computer-executable instructions, directed to steps comprising:
receiving an instruction from a user to post the user-authored content to the social networking context, which is maintained by a social networking service that is external to the system;
generating a presentation of the user-authored content such that the presented user-authored content appears to have already been posted to the social networking context; and
transmitting the user-authored content to the social networking service after the generating the presentation only if both at least one predetermined condition, exclusive of the received instruction, is met and the user has not attempted to undo the posting of the user-authored content subsequent to the receiving the instruction;
wherein the one or more processing units utilize the network interface to transmit the computer-executable instructions to a client computing device for execution on the client computing device.

18. The system of claim 17, wherein the one or more computer-readable storage media comprise further computer-executable instructions for discarding the user-authored content if the user attempts to undo the posting subsequent to the receiving the instruction but prior to the transmitting the user-authored content to the social networking service.

19. The system of claim 17, wherein the computer-executable instructions for generating the presentation of the user-authored content comprise computer-executable instructions for providing a deletion option until the at least one predetermined condition is met; and removing the deletion option after the at least one predetermined condition is met.

20. The system of claim 17, wherein the one or more computer-readable storage media comprise further computer-executable instructions for: receiving, after the transmitting the user-authored content to the social networking service, an instruction from the user to delete the user-authored content from the social networking context; and transmitting a request to the social networking service to delete the user-authored content in response to the received instruction from the user to delete the user-authored content.

* * * * *